US012373179B2

(12) United States Patent
Kundu et al.

(10) Patent No.: US 12,373,179 B2
(45) Date of Patent: Jul. 29, 2025

(54) SYSTEM AND METHOD FOR DECOMPOSING MONOLITH APPLICATIONS INTO SOFTWARE SERVICES

(71) Applicant: Siemens Aktiengesellschaft, Munich (DE)

(72) Inventors: Debasish Kundu, West Bengal (IN); Chinnamma Sreeram, Karnataka (IN); Rajaram Thiyagarajan, Karnataka (IN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 128 days.

(21) Appl. No.: 18/372,816

(22) Filed: Sep. 26, 2023

(65) Prior Publication Data
US 2024/0118877 A1      Apr. 11, 2024

(30) Foreign Application Priority Data
Sep. 30, 2022   (EP) ..................................... 22199024

(51) Int. Cl.
*G06F 8/41*       (2018.01)
*G06F 8/36*       (2018.01)
*G06F 8/76*       (2018.01)

(52) U.S. Cl.
CPC ............... *G06F 8/433* (2013.01); *G06F 8/36* (2013.01); *G06F 8/76* (2013.01)

(58) Field of Classification Search
None
See application file for complete search history.

(56) References Cited

U.S. PATENT DOCUMENTS

| 10,628,152 | B2 * | 4/2020 | Chandramouli | .......... G06F 8/65 |
| 10,782,934 | B1 * | 9/2020 | Chawda | .................... G06F 8/30 |

(Continued)

FOREIGN PATENT DOCUMENTS

EP           3693848 A1       8/2020

OTHER PUBLICATIONS

Ren et al., "Migrating Web Applications from Monolithic Structure to Microservices Architecture," ACM, 2018, 11pg. (Year: 2018).*

(Continued)

*Primary Examiner* — Ryan D. Coyer
(74) *Attorney, Agent, or Firm* — Schmeiser, Olsen & Watts LLP

(57) ABSTRACT

A computer system and method for decomposing a monolith application into one or more software services is provided. In embodiments, the method includes obtaining a feature model associated with the monolith application from a source. Further, at least one bounded context present in the feature model is computed using a graph-based traversal algorithm, wherein the bounded context is associated with a bounded keyword. Further, a requirement cluster contextually relevant to the at least one bounded context is selected from one or more requirement clusters, based on similarity between the bounded keyword and at least one cluster keyword corresponding to each of the requirement clusters. Further, one or more file packages corresponding to the contextually relevant requirement cluster is identified, wherein the identified the one or more file packages correspond to at least one software service.

15 Claims, 7 Drawing Sheets

(56) References Cited

U.S. PATENT DOCUMENTS

| | | | |
|---|---|---|---|
| 11,853,753 B1* | 12/2023 | Chawda | G06F 11/34 |
| 2018/0088935 A1* | 3/2018 | Church | G06F 11/3051 |
| 2019/0108067 A1* | 4/2019 | Ishikawa | H04L 41/50 |
| 2021/0011688 A1* | 1/2021 | Sasidharan | G06F 8/10 |
| 2021/0294601 A1* | 9/2021 | Vs | G06F 8/75 |
| 2023/0084685 A1* | 3/2023 | Tamilselvam | G06F 8/76 |
| | | | 717/123 |

OTHER PUBLICATIONS

Tapia et al., "From Monolithic Systems to Microservices: A Comparative Study of Performance," J. Appl. Sci, 2020, 35pg. (Year: 2020).*

Kuryazov Dilshodbek et al; "Towards Decomposing Monolithic Applications into Microservices"; 2020 IEEE 14th international conference on application of information and communication technologies; published: Oct. 7, 2020; pp. 1-4; XP033884184; DOI: 10.1109/AICT50176.2020.9368571.

Gholami Mahdi Fahmideh et al;"Cloud migration process. A survey, evaluation framework, and open challenges"; Journal of systems & software, elsevier North Holland; published: Jun. 28, 2016; pp. 31-69; vol. 120; XP029688556; ISSN: 0164-1212; Doi: 10.1016/J.JSS.2016.06.068.

Wei Yuyang et al; "A Feature Table approach to decomposing monolithic applications into microservices"; 2021 international Symposium on electrical, electronics and information engineering; published: Nov. 1, 2020; pp. 21-30; XP058878778; DOI: 10.1145/3457913.3457939; ISBN: 978-1-4503-8514-5.

* cited by examiner

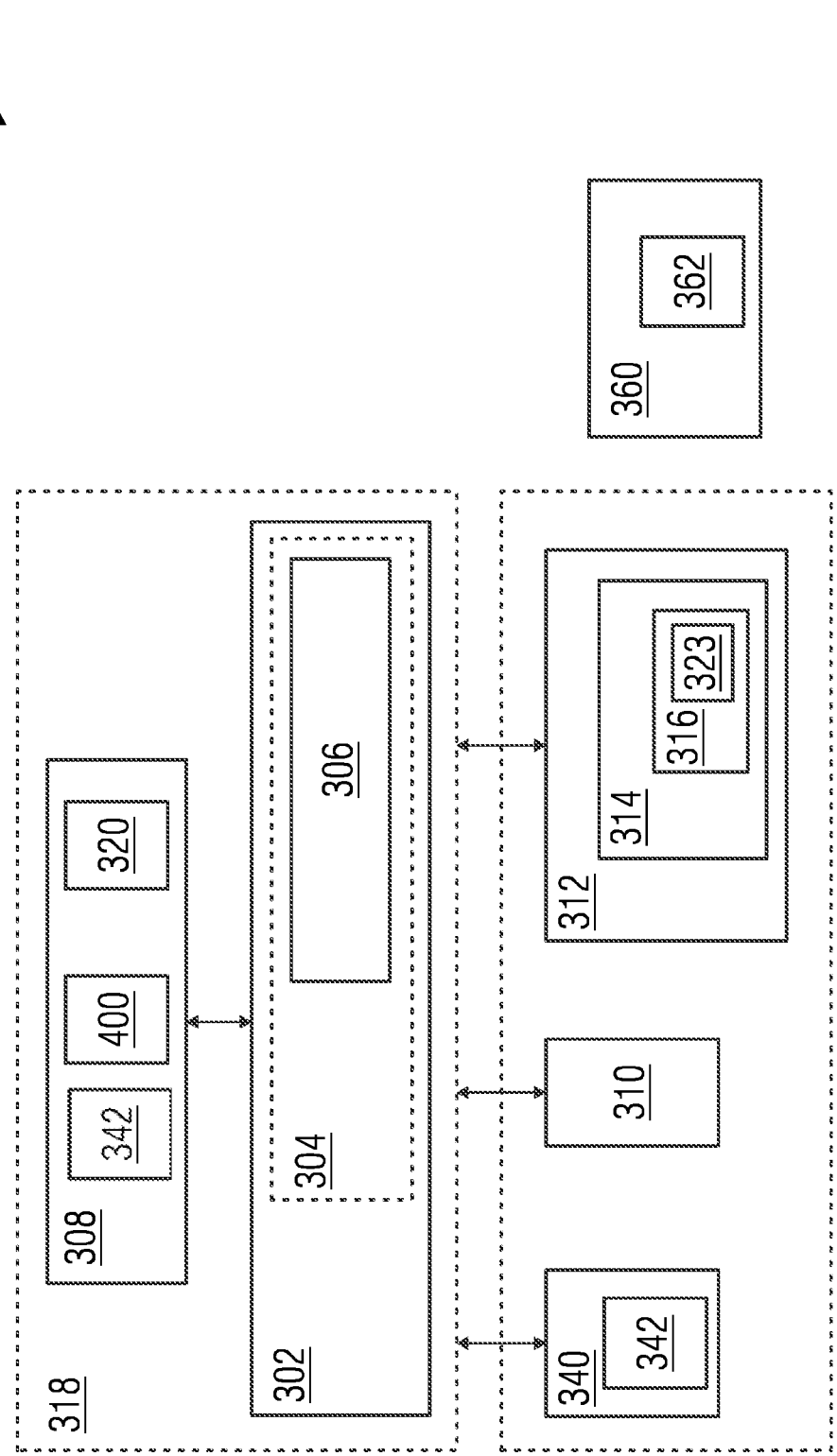

SYSTEM AND METHOD FOR DECOMPOSING MONOLITH APPLICATIONS INTO SOFTWARE SERVICES

CROSS-REFERENCE TO RELATED APPLICATIONS

This application claims priority to EP Application No. 22199024.5, having a filing date of Sep. 30, 2022, the entire contents of which are hereby incorporated by reference.

FIELD OF TECHNOLOGY

The following relates to software management systems, and in particular relates to a computer system and method for decomposing monolith applications into one or more software services.

BACKGROUND

With digital transformation pushing the need for customized software solutions to be deployed as per a customer's requirement, the need for software platforms that enable rapid value creation by building connections with various tools, resources and processes, and by providing reusable software services. The term 'software platforms' or platforms as used herein refers to basic hardware i.e., computer system and software i.e., operating system on which software applications are run. Such platforms enable application developers to use reusable assets available on the platform in order to reduce time-to-market associated with developing a customized software solution. Further, such platforms may also enable content providers and consumers to collaborate and provide value added services.

In an example, digital industrial platforms require connected Product Lifecycle Management (PLM) services that help create a seamless collaborative environment for bringing together people, process and data. It is desirable to have PLM services that are agile, light weight, easy-to-deploy and reusable so that they are adaptable with resources associated with the platform. The above factors also ensure that such PLM services are cost effective. However, monolith applications generally lack agility and comprise software functions and/or feature services that are tightly coupled. In order to deploy monolith applications on a platform, the monolith application must be decomposed into a plurality of software services. However, rewriting of source code associated with monolith applications to generate corresponding software services demands extensive manual efforts and therefore also increases cost associated with deployment of the software services. Further, an individual rewriting the source code requires extensive domain knowledge and must employ static code analysis to identify service boundaries corresponding to software services within the monolith application.

For example, manual identification of software services present in a monolith application is challenging, as such monolith applications usually contain business domains in different architectural layers. It may so happen that some architectural layers do not perform any business logic while processing specific tasks. This results in consumption of unnecessary resources such as memory and processing capacity.

In light of the above, there exists a need for a mechanism to decompose monolith applications into software services effectively with minimal manual efforts.

SUMMARY

An aspect relates to methods and computer systems that may be used to facilitate decomposition of monolith applications into software services.

According to a first aspect of embodiments of the invention, a computer-implemented method of decomposing a monolith application into one or more software services is disclosed. In embodiments, the method comprises obtaining, by a processor, a feature model associated with the monolith application from a source, wherein the feature model is a graph data structure representative of relationships between functions and feature services in the monolith application. In embodiments, the method further comprises computing at least one bounded context present in the feature model using a graph-based traversal algorithm, wherein the bounded context is a subgraph of the feature model indicative of a function and one or more feature services required for implementing the function within the monolith application, and wherein the bounded context is associated with a bounded keyword. In embodiments, the method further comprises selecting a requirement cluster contextually relevant to the at least one bounded context from one or more requirement clusters, based on similarity between the bounded keyword and at least one cluster keyword corresponding to each of the requirement clusters. In embodiments, the method further comprises identifying at least one file package corresponding to the contextually relevant requirement cluster, for mapping to the bounded context, wherein the identified at least one file package corresponds to at least one software service. In embodiments, the method further comprises providing a graphical representation indicative of the one or more file packages corresponding to the at least one software service on an application management user interface. In an embodiment, the method further comprises transmitting the at least one file package to a target platform for deploying the at least one software service on the target platform.

According to a second aspect of embodiments of the invention, a computer system may be arranged and configured to execute the steps of the above-described computer-implemented method of decomposing a monolith application into one or more software services.

According to a third aspect of embodiments of the invention, a computer-readable medium may be encoded with executable instructions, that program product may comprise computer program code which, when executed, cause the computer system to carry out the described computer-implemented method of decomposing a monolith application into one or more software services.

According to a fourth aspect of embodiments of the invention, a computer-readable medium may comprise computer program code which, when executed by a computer system, cause the computer system to carry out this computer-implemented method of decomposing a monolith application into one or more software services. By way of example, the described computer-readable medium may be non-transitory and may further be a software component on a storage device.

The foregoing has outlined rather broadly the technical features of the present disclosure so that those skilled in the conventional art may better understand the detailed description that follows. Additional features and advantages of the disclosure will be described hereinafter that form the subject of the claims. Those skilled in the conventional art will appreciate that they may readily use the conception and the specific embodiments disclosed as a basis for modifying or designing other structures for carrying out the same purposes of the present disclosure. Those skilled in the conventional art will also realize that such equivalent constructions do not depart from the spirit and scope of the disclosure in its broadest form.

Also, before undertaking the detailed description below, it should be understood that various definitions for certain words and phrases are provided throughout this patent document and those of ordinary skill in the conventional art will understand that such definitions apply in many, if not most, instances to prior as well as future uses of such defined words and phrases. While some terms may comprise a wide variety of embodiments, the appended claims may expressly limit these terms to specific embodiments.

BRIEF DESCRIPTION

Some of the embodiments will be described in detail, with reference to the following figures, wherein like designations denote like members, wherein:

FIG. 3 illustrates a functional block diagram of an example computer system or data processing system that facilitates decomposition of a monolith application into one or more software services, in accordance with an embodiment of the present invention;

DETAILED DESCRIPTION

Figure 1:
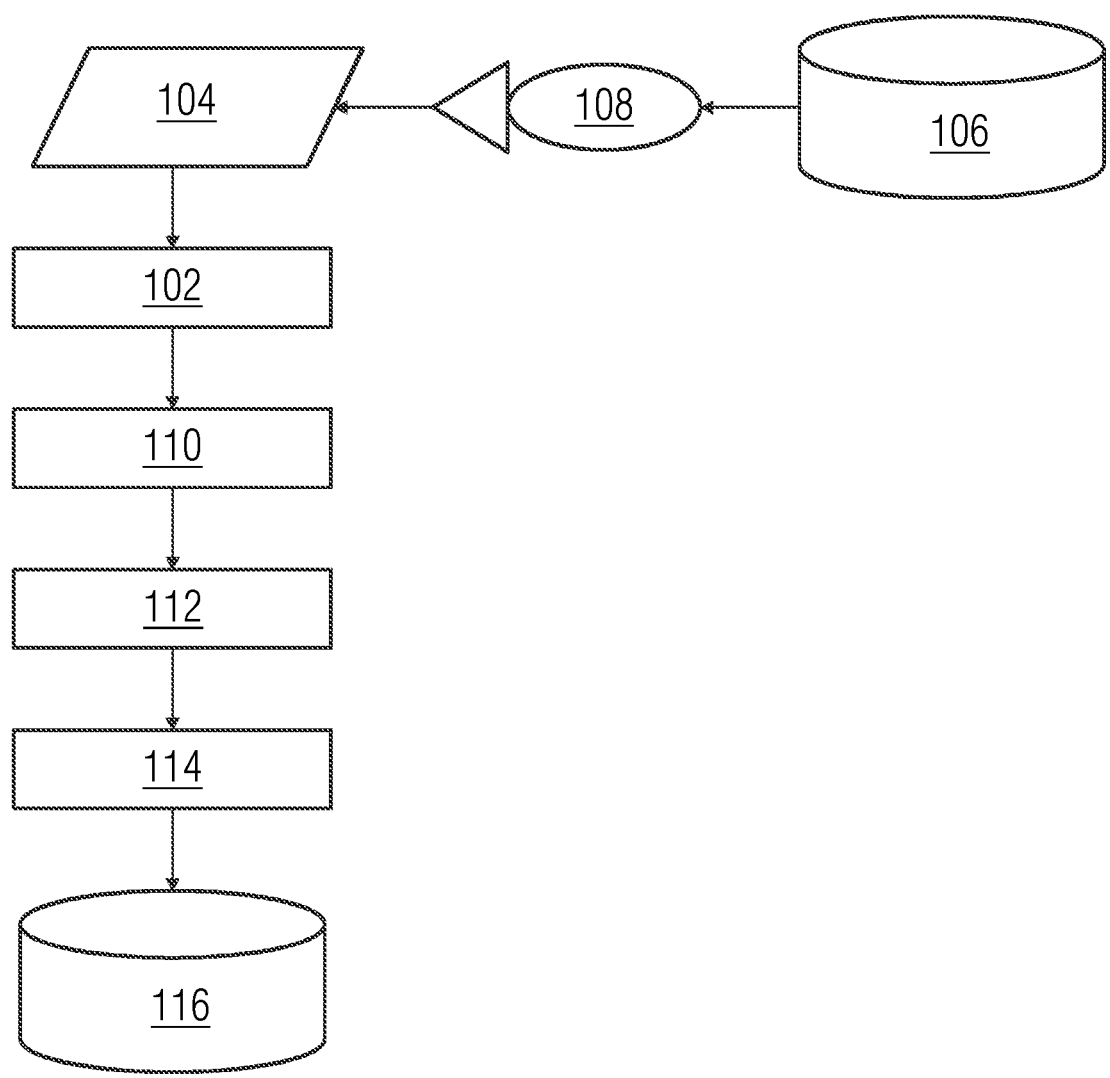
FIG. 1 shows a flowchart of a method of generating a traceability knowledge graph for a monolith application, in accordance with an embodiment of the present invention.

Various technologies that pertain to systems and methods for decomposing monolith applications into software services, in a product system will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the conventional art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present patent document will be described with reference to exemplary non-limiting embodiments.

A monolith application refers to a software program that performs a set of related tasks using tightly coupled functions. Herein, a task is a basic unit of programming that is controlled by an operating system. The monolith application may include, for example, product lifecycle management (PLM), product data management (PDM), software development platforms etc. The monolith application may be created, edited, and represented using traditional source code. Examples of such traditional source code comprise C, C++, Java, Flash, Python, Perl, and other script-based methods of programming. Developing, creating and managing such monolith applications may be accomplished by manual coding of suitably trained users.

Developers often use Application Development Frameworks ("ADFs") (which are by themselves applications or apps) for implementing/developing desired monolith applications. An ADF provides a set of pre-defined code/data modules that can be directly/indirectly used in the development of the monolith application. An ADF may also provide tools such as an Integrated Development Environment ("IDE"), code generators, debuggers, etc., which facilitate a developer in coding/implementing the desired logic of the monolith application.

FIG. 1 shows a flowchart of a method 100 of generating a traceability knowledge graph for a monolith application, in accordance with an embodiment of the present invention.

At step 102, one or more artifacts 104 related to the monolith application are extracted from one or more data sources 106, via one or more data connectors 108. In the present embodiment, the one or more artifacts 104 are stored in the one or more data sources 106. Examples of the one or more data sources 106 may include, but not limited to, Application Lifecycle Management Tools such as TFS, TMS, Jira, Confluence, IBM JAZZ and Clear Case. Each of the data sources 106 includes an Application Programming Interface that may be accessed via the data connector 108. The term 'data connector' as used herein refers to a stand-alone software or a function that imports, exports or converts one data format to another. In the present embodiment, the data connector 108 extracts or imports the one or more artifacts 104 from the respective data source 106. More specifically, the data connector 108 connects to the API of the respective data source 106 and exposes a granular API to a data layer. The data layer is based on a predetermined schema. The granular API exposes the one or more artifacts 104 relevant to the predetermined schema of the data layer. The data layer stores the relevant artifacts 104 extracted from the respective data source 106 in the form of semantic data.

At step 110, one or more entities are identified from the extracted artifacts 104 based on an entity configuration parameter. More specifically, a specific class of entities present in the semantic data within the data layer are identified. The specific class of entities is identified based on an entity configuration parameter. For example, the entities may indicate different artifacts used during a software development lifecycle. For example, a first class of entities, say class1, may correspond to agile methodology and may include 'user story', 'epic', 'features' etc. In another example, a second class of entities, say class2, may correspond to Scrum methodology and may include, but not limited to, 'product backlog', 'sprint backlog' and 'increment'. The entity configuration parameter may be predefined to identify entities belonging to one of the classes of entities. For example, if the development is based on agile methodology, the entity configuration parameter may be predefined to identify entities from the first class of entities.

At step 112, the one or more entities are mapped to an ontology structure based on an ontology configuration parameter. The ontology structure is selected from a predefined set of ontology structures based on the ontology configuration parameter. For example, the ontology structures may be defined separately for different domains. The domains may vary based on use of the monolith application. Non-limiting examples may include human resources, sales, engineering, manufacturing, inventory, design, planning, maintenance etc. For example, the entity 'Employee number' that may be used in human resources domain may be mapped to 'Part number' in manufacturing domain using an ontology structure for maintenance. Similarly, the ontology structures may also vary based on software-related vocabulary of a targeted user of the monolith application, as different users may prefer different terminologies for the same entity. For example, an entity called 'Feature' may be referred to as 'Minimum Marketable Feature'. In addition to mapping the entities to a target ontology, the ontology structures also define relationships between the mapped entities. For example, if changes in a first entity impacts a second entity, then the second entity shares a parent-child relationship with the first entity.

At step 114, a traceability knowledge graph is generated for the one or more artifacts 104 based on the mapped entities. In particular, triples are generated for the mapped entities using predefined libraries. In an embodiment, each of the mapped entities is processed using a Web Ontology Language (OWL) library to generate the triples. The triples are further stored as the traceability knowledge graph in a graph database 116. The traceability knowledge graph is a graph structure indicative of relationships between a plurality of artifacts generated during a development phase of the monolith application. The plurality of artifacts comprises at least epics and file packages associated with the monolith application. In particular, the relationships are defined by nodes, edges and properties. In implementation, the traceability knowledge graph is based on Resource Description Framework (RDF) format. The term 'triple' as used herein refers to a set of three entities that codifies a statement about the mapped entities in the form of subject-predicate-object expressions. An example of a triple is (SubEpic1, Has child, ChangeList1) or (ChangeList1, Has Parent, SubEpic1) which links the artifact SubEpic1 to another artifact ChangeList1 via a parent-child relationship. In other words, changes in the parent node 'ChangeList1' impacts the child node 'SubEpic1'. Non-limiting examples of graph databases include Neo4j, GraphDB, OrientDB, and InfiniteGraph. The traceability knowledge graph stored in the graph database 116 may be queried using a query language, e.g., SPARQL, in order to access various artifacts associated with the monolith application.

Hereinafter, embodiments of the present invention are explained in the context of agile development methodology, for ease of explanation.

Figure 2:
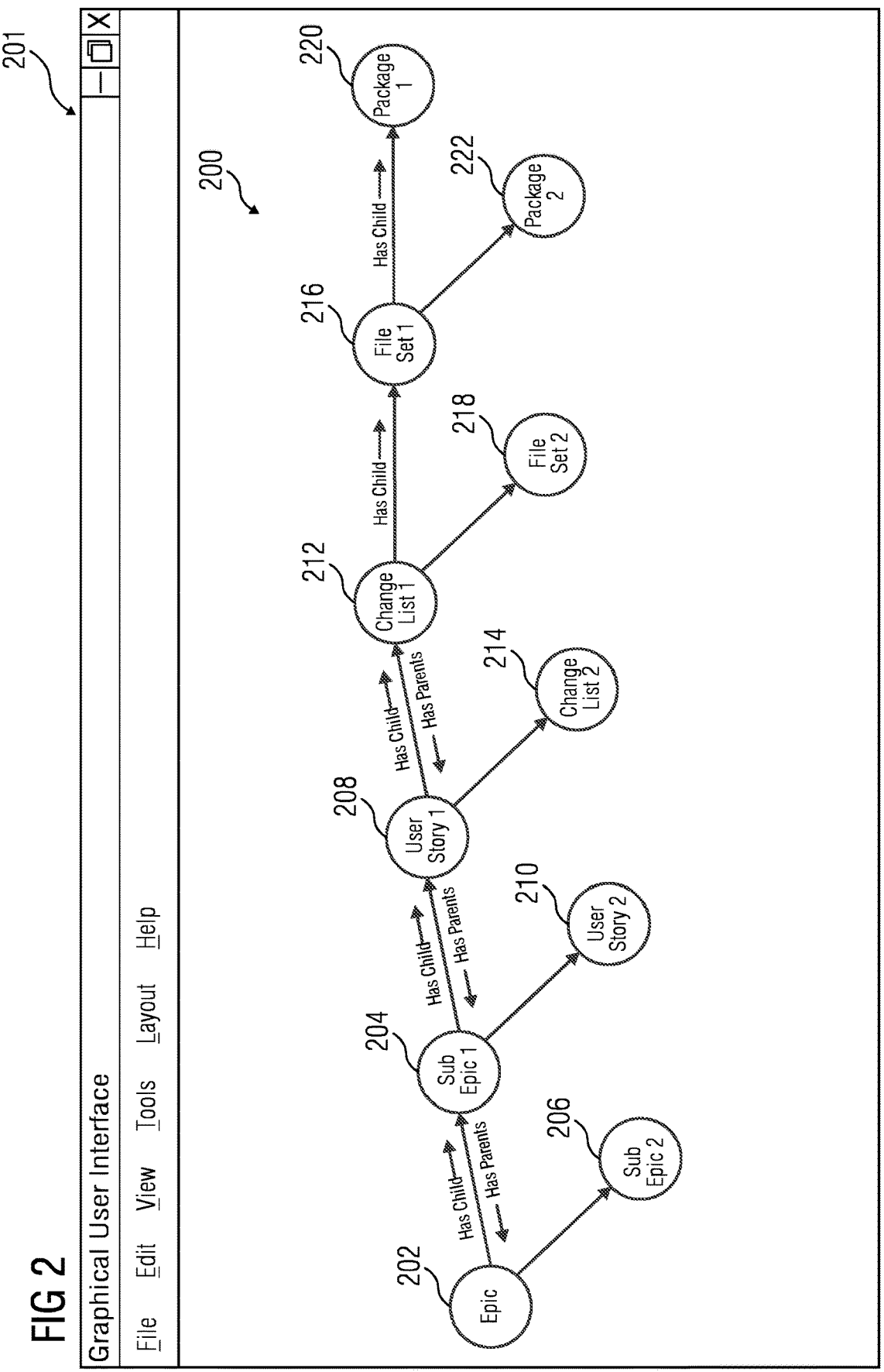
FIG. 2 shows a Graphical User Interface displaying an exemplary traceability knowledge graph, in accordance with an embodiment of the present invention.

FIG. 2 shows a Graphical User Interface 200 displaying an exemplary traceability knowledge graph, in accordance with an embodiment of the present invention. The traceability knowledge graph comprises a node Epic 202 corresponding to an epic of the monolith application. Herein, the term 'epic' refers to a set of tasks that is segmented into specific tasks called user stories based on requirements of an end-user of the monolith application. In particular, epics help to organize tasks by creating a hierarchy in a software development lifecycle.

The node 202 is associated with a file associated with the epic. The node 202 has two child nodes SubEpic1 204 and SubEpic2 206, corresponding to sub-epics 'SubEpic1' and 'SubEpic2' respectively of the epic. The node SubEpic1 204 has two child nodes User Story1 208 and User Story2 210, corresponding to user stories 'User Story 1' and 'User Story2' respectively, associated with 'SubEpic1'. Further, the node User Story1 208 has two child nodes Change List1 212 and Change List2 214, corresponding to change lists 'Change List1' and 'Change List2' respectively of 'User Story1'. The node Change List1 212 has two child nodes 'File Sett' 216 and 'File Set2' 218, corresponding to the file sets 'File Sett' and 'File Set2' respectively associated with 'Change List1'. Furthermore, the node File Sett 216 has two child nodes Package1 220 and Package2 222, corresponding to file packages 'Package1' and 'Package2' associated with 'File Sett'.

With reference to FIG. 3, a functional block diagram of an example computer system or data processing system 300 that facilitates decomposition of a monolith application into one or more software services, is illustrated, in accordance with an embodiment of the present invention.

The computer system 300 may include an application management platform 318 including at least one processor 302 that is configured to execute at least one monolith management module 306 from a memory 304 accessed by the processor 302. Herein, the application management platform 318 may include the above-described functionalities of application development. The monolith management module 306 may be configured (i.e., programmed) to cause the processor 302 to carry out various acts and functions described herein. For example, the described monolith management module 306 may include and/or correspond to one or more components of an application development platform or an application lifecycle management platform that is configured to manage traceability knowledge graphs and feature models associated with the monolith application stored in a database 308. The database 308 may be one of an internal/external storage unit or local database associated with the computer system 300 and a remote server database.

By way of example, the application management platform 318 may be cloud-based, internet-based and/or be operated by a provider providing application development and creation support. The user may be located close to the application management platform 318 or remote to the application management platform 318, e.g., using a mobile device for connecting to the application management platform 318, e.g., via the internet, wherein the mobile device may include an input device 310 and a display device 312. Non-limiting examples of display devices include desktop monitors, tablets, laptop screen etc. In some examples, the application management platform 318 may be installed and run on a user's device, such as a computer, laptop, pad, on-premise computing facility, or the like.

Examples of product systems that may be adapted to include the application development features described herein include a software development platform. This platform provides tools to build, test, deploy, iterate, develop, create and manage applications.

Herein, the term 'software services' refers to deployable services generated based on one or more functions and related one or more feature services associated with the monolith application. In an embodiment, the software service may be in the form of microservices. It must be appreciated that conversion of a software in monolith architecture to a software service provides more flexibility for deploying on different target platforms. A software service typically includes software programs accessible through a web browser, without the necessity for installing the software program on a device. The software service enables the user to display, run, access, and interact directly or indirectly with functions of a software product.

To enable decomposition of the monolith application to software services, the described product system or computer system 300 may include at least one input device 310 and at least one display device 312 (such as a display screen). The described processor 302 may be configured to generate a graphical user interface (GUI) 314 through the display device 312. Such a GUI 314 may include GUI elements such as buttons, links, search boxes, lists, text boxes, images, scroll bars usable by a user to provide inputs through the input device 310 to provide inputs required for initiating decomposition of the monolith application, and to deploy software services obtained from the decomposition of the monolith application to a target platform 340. By way of example, the GUI 314 may be an application management UI 316 provided to a user for uploading or creating a feature model corresponding to the monolith application and a search UI 323 within the application management UI 316 to enable the user to search for artifacts present within a traceability knowledge graph stored in a graph database 320, or to search for files comprising the feature model from the database 308. In an example, the graph database 320 may be part of the database 308 as shown in FIG. 3.

In an embodiment, the monolith management module 306 and/or the processor 302 is configured to obtain a feature model associated with the monolith application from a source. As described earlier with reference to FIG. 3, a feature model is a graph data structure representative of relationships between functions and feature services in the monolith application. In an embodiment, the feature model is obtained in the form of an input file in JSON format, from a user, via the input device 310. For example, the user may upload the input file with the help of the input device 310. In another embodiment, input file is selected from a plurality of files present within the database 308.

The monolith management module 306 and/or the processor 302 is further configured to compute at least one bounded context present in the feature model using a graph-based traversal algorithm.

Figure 4A:
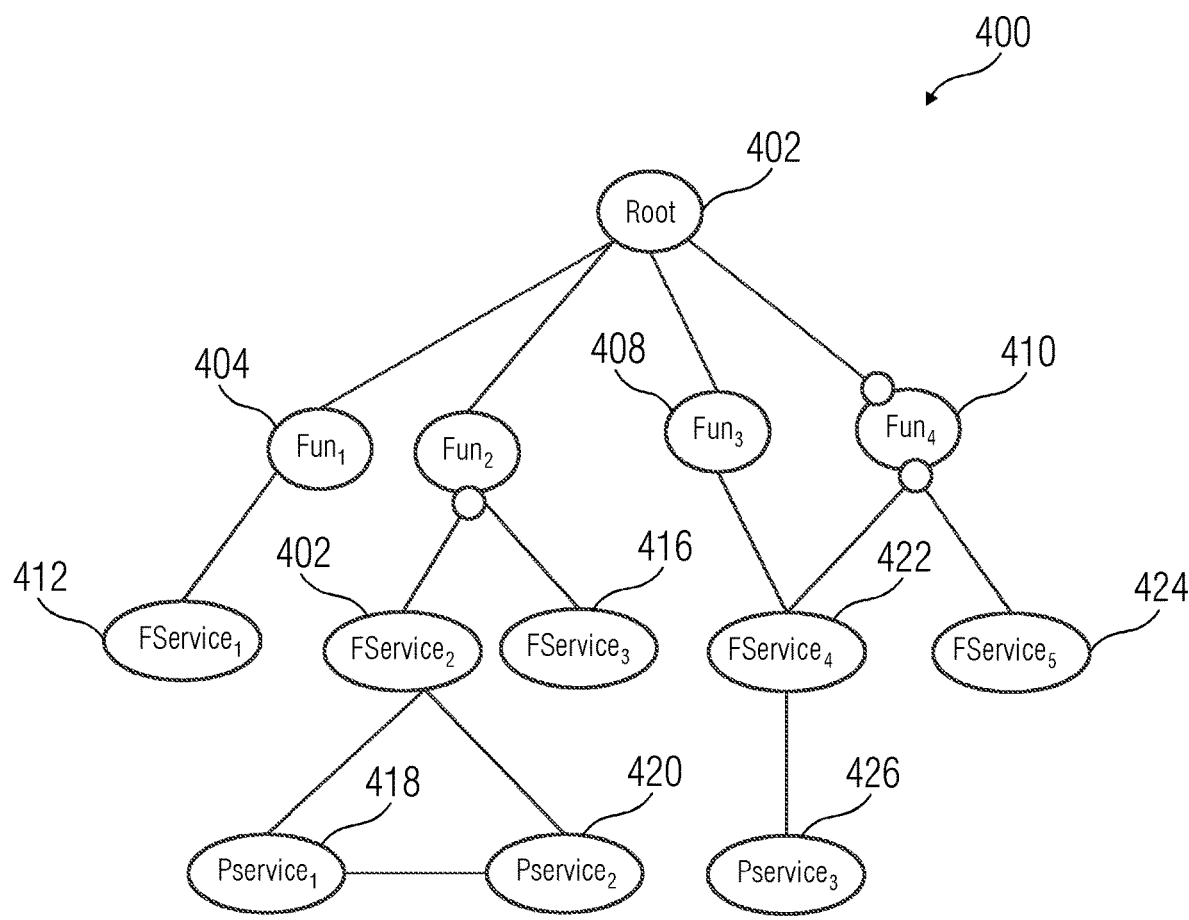
FIG. 4A illustrates a feature model associated with the monolith application, in accordance with an embodiment of the present invention.

The term 'bounded context' as used herein refers to a subgraph of the feature model that is indicative of a function and feature services required for implementing the function within the monolith application. In other words, a bounded context is indicative of a tangible boundary between domains of two or more software services encapsulated within the monolith application. FIG. 4A shows an example of a feature model 400 associated with the monolith application, in accordance with an embodiment of the present invention.

The term 'feature model' as used herein, refers to a graph data structure that depicts relationship between functions and feature services in a monolith application. Herein, the term 'function' refers to a set of tasks that enable implementation of a feature associated with the monolith application, wherein the feature corresponds to a capability of the monolith application. For example, if the monolith application is a Product Lifecycle Management tool, the feature may include providing design information of a product to an end-user. The function for implementing the feature may include, for example, obtaining design data associated with the product from one or more design tools. The term 'feature service' refers to a set of code that performs automated tasks, responds to hardware events, or listens for data requests from other feature services. In the present example, the feature services may include monitoring for updates in design data generated by the one or more design tools, reading the updated design data from an output of a design tool and displaying the updated design data to the end-user.

In particular, the feature model 400 is a predefined artifact associated with the monolith application, developed by an expert (for example, a developer) based on functions and feature services used in the monolith application. It may be appreciated that the feature model 400, as described above, serves the purpose of encoding domain knowledge associated with the expert for enabling management of the monolith application. In particular, the feature model 400 provides a graphical representation of features associated with the monolith application. Each of the features is defined using a set of cohesive and distinguishable function clusters. The function clusters may include one or more functions. Further, each function is composed of one or more feature services. Each feature service is part of a library of services and may be one of a primitive service and a complex service. Herein, the term 'primitive service' refers to a basic service, whereas the term 'complex service' is composed of a plurality of basic feature services.

In the present embodiment, the feature model 400 comprises a root node 402. The root node 402 has four child nodes Fun1 404, Fun2 406, Fun3 408 and Fun4 410. Each of the four child nodes Fun1 404, Fun2 406, Fun3 408 and Fun4 410 represents a function in the monolith application. The function Fun4 410, as indicated in FIG. 4A, is an optional function of the monolith application. The function Fun1 402 is associated with a feature service FService1, as indicated by the node 412. The function Fun2 404 is associated with two feature services, FService2 414 and FService3 416. In other words, the function Fun2 404 may select one or both of FService2 414 and FService3 416 during execution, as indicated at the vertex from the node 404. The feature service FService2 414 is further composed of two primitive feature services PService1 418 and PService2 420, where PService1 418 is dependent on PService2 420 during execution. Similarly, the function Fun3 408 is associated with a feature service FService4 422, and the function Fun4 410 is associated with one of the feature service FService4 422 and another feature service FService5 424. The labels (Fun1, Fun2, Fun3 and Fun4) on each of the nodes indicate an identifier associated with the function. The labels FService1, FService2, . . . PService1, PService2 etc. represent identifiers assigned to the respective feature services. The identifier may be user-defined or defined by the computer system 300 based on predefined conventions.

In an embodiment, the graph-based traversal algorithm is a Depth First Search (DFS) algorithm. The DFS algorithm is a recursive algorithm that iteratively explores or visits nodes across a 'depth' of a graph structure. The DFS algorithm firstly forms a stack based on total number of vertices present in the feature model 400. A pair of parent-child nodes present in the feature model 400, say 402 and 404, that are connected by the directed arrow may henceforth be referred to as an arc. If both the parent and child nodes in an arc are visited by the DFS algorithm, the arc is said to be explored. Otherwise, the arc is said to be unexplored. In the present example, the stack is of size 13 or greater as the feature model consists of 13 vertices or nodes 402, 404, 406 . . . 424. It must be understood by a person skilled in the art that the stack size may be statically set at an upper limit, or dynamically set based on size (i.e., number of vertices) of the feature model 400.

In the present embodiment, the DFS algorithm is adapted to choose the root node 402 (i.e., the node with no parent nodes) of the feature model 400 as a starting point for the graph traversal. Further, non-visited node among unexplored arcs originating from the node 402, say node 404, is selected for pushing to the top of the stack next. When a node is visited, the node is removed from the stack and added to a 'visited list' to indicate that the node is no longer a non-visited node. Similarly, the stack and the visited list are updated each time a node in the feature model 400 is traversed. While traversing the feature model 400, whenever a leaf node (i.e., a node that doesn't possess child nodes) is reached, all nodes along the path from the first node representing a function up to the leaf node constitute a bounded context. As may be understood from the above description, the graph-based traversal algorithm enables partitioning of nodes in the feature model, in order to group a specific function of the monolith application with related primary or complex services used for implementing the function.

In the present example, the bounded contexts may be identified as follows:

A first bounded context BC1={Fun1, FService1}

A second bounded context BC2={Fun2, FService2, PService1}

A third bounded context BC3={Fun2, FService2, PService2}

A fourth bounded context BC4={Fun2, FService3}

A fifth bounded context BC5={Fun3, FService4, PService3}

A sixth bounded context BC6={Fun4, FService4, PService3}

In a further embodiment, bounded contexts whose majority elements are similar are merged to form an updated bounded context. In the present example, the updated bounded contexts may be as follows:

$BC1' = BC1 = \{Fun1, FService1\}$ $BC2' = BC2 \cup BC3$ (union or combination of $BC2$ and $BC3$) =

$\{Fun2, FService2, PService1, PService2\}$ $BC3' = BC4 = \{Fun2, FService3\}$; and $BC4' = BC5 \cup BC6$ (union or combination of $BC5$ and $BC6$) =

$\{Fun3, Fun4, FService4, PService3\}$

Figure 4B:
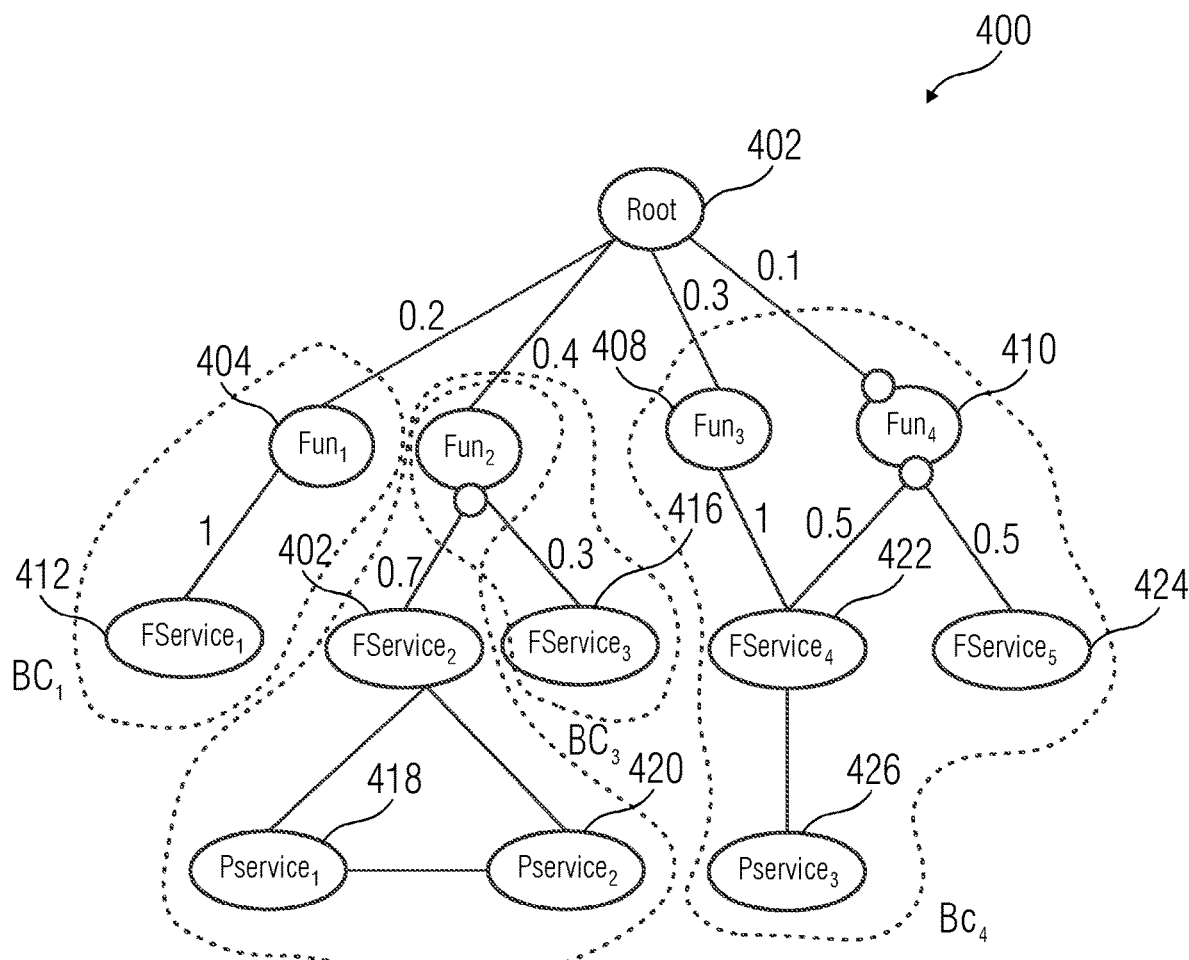
FIG. 4B illustrates a feature model associated with the monolith application, in accordance with an embodiment of the present invention.

In the subsequent description, BC1', BC2', BC3', BC4' are referred to as BC1, BC2, BC3, BC4 respectively for the sake of simplicity. FIG. 4B diagrammatically represents the bounded contexts BC1 BC2, BC3, BC4 associated with the feature model 400.

Each of the computed bounded contexts is associated with a bounded keyword. Herein, the term 'bounded keyword' refers to a set of keywords, each of the keywords corresponding to labels of nodes present in the bounded context.

The monolith management module 306 and/or the processor 302 is further configured to select a requirement cluster contextually relevant to the bounded context from one or more requirement clusters, based on similarity between the bounded keyword and at least one cluster keyword corresponding to one or more requirement clusters. Each of the requirement clusters comprises one or more epics. Further, each of the one or more epics correspond to one or more file packages. For example, in the traceability knowledge graph of FIG. 2, the epic (node 202) comprises two packages Package1 (node 220) and Package2 (node 222).

In an embodiment, the monolith management module 306 and/or the processor 302 is configured to select the contextually relevant requirement cluster corresponding to the at least one bounded context based on the traceability knowledge graph associated with the monolith application. The traceability knowledge graph comprises artifacts related to the monolith application, as explained earlier with reference to FIG. 2. In the present embodiment, the artifacts include end-user's requirements, epics, user stories, change sets, code files and file packages used during a development phase of the monolith application. Herein, the change sets are files containing versioning information and change logs associated with code files. The code files include, for example, object code files and/or source code files, that comprise codes for implementation of specific tasks related to a user story. The file packages include code files that are necessary for installation of a specific function associated with the monolith application. The traceability knowledge graph for the monolith application may be generated as explained with reference to FIG. 1.

In an embodiment, the monolith management module 306 and/or the processor 302 is further configured to generate one or more requirement clusters from the traceability knowledge graph associated with the monolith application. The step of generating the one or more requirement clusters includes firstly determining similarity between epics in the traceability knowledge graph based on similarity between epic keywords associated with the epics. The term 'epic keyword' as used herein refers to a string that uniquely represents data present within the corresponding epic. Further, similar epics are grouped to generate the one or more requirement clusters.

In an embodiment, the epic keywords for each of the epics in the traceability knowledge graph are identified using a keyword extraction algorithm. In an example, the keyword extraction algorithm is Rapid Automatic Keyword Extraction (RAKE) algorithm. For example, the RAKE algorithm may parse a file associated with the epic in order to generate the epic keywords. Further, similarities among epics in the traceability knowledge graph are identified based on similarities in the corresponding epic keywords. In an embodiment, the similarity between the epic keywords is determined using soft cosine similarity algorithm. In an example, the similarity may be identified, at a time, for a pair of epic keywords selected from a set of epic keywords. In another example, similarity among a set of epic keywords comprising three or more epic keywords may be identified.

In an embodiment, the similarity between the epic keywords is determined by firstly, determining vector embedding corresponding to each epic keyword among a plurality of epic keywords. This is because the epic keywords are text inputs. For the soft cosine similarity algorithm to process text inputs, the text inputs are to be converted to vector embeddings. In an example, word2vec function in Python may be used to generate the vector embeddings from the text inputs.

The vector embedding of the epic keyword is further compared to the vector embedding of each of the other epic keywords among the plurality of epic keywords, using the soft cosine similarity algorithm. The output of the soft cosine similarity algorithm is a value between 0 and 1. The smaller the output of the soft cosine similarity algorithm, greater is the similarity between vector embeddings provided as input to the soft cosine similarity algorithm. In the present embodiment, the soft cosine similarity algorithm generates a first similarity value as output. The first similarity value generated for two or more epic keywords is indicative of an extent of similarity in the respective epics corresponding to the two or more epic keywords. For example, a first similarity value of 1 indicates that the epic keywords are identical, and a first similarity value of 0 indicates that the epic keywords have no similarity. In another example, if the first similarity value is 0.8 or above, the epic keywords may be identified to be similar. Further, epics corresponding to similar epic keywords are clustered or grouped to generate a requirement cluster.

In an embodiment, selecting a requirement cluster contextually relevant to the at least one bounded context from the one or more requirement clusters includes determining vector embeddings corresponding to each of the bounded keyword and the at least one cluster keyword corresponding to each of the requirement clusters. The term 'cluster keyword' as used herein refers to a string that uniquely represents data present within a requirement cluster.

Similar to the case of generating vector embeddings for epic keywords, the vector embeddings corresponding to each of the bounded keyword and the at least one cluster keyword may be determined using predefined functions, e.g., using the word2vec function in Python. Further, the vector embedding of the bounded keyword is compared with the vector embedding of each of the at least one cluster keyword corresponding to the one or more requirement clusters using soft cosine similarity algorithm. Further, the contextually relevant requirement cluster is identified based on a second similarity value generated by the soft cosine similarity algorithm. For example, a second similarity value of 1 indicates that the cluster keyword and the bounded keyword are identical, and a similarity value of 0 indicates that the cluster keyword and the bounded keyword are dissimilar. Further, a requirement cluster contextually relevant to the bounded context is identified from the one or more requirement clusters based on the second similarity value. For example, if a cluster keyword associated with a requirement cluster cluster1, and a bounded keyword corresponding to the bounded context BC1, have a second similarity value of 1, then the requirement cluster cluster1 is contextually relevant for the bounded context BC1.

The monolith management module 306 and/or the processor 302 is further configured to identify one or more file packages corresponding to the contextually relevant requirement cluster, for mapping to the bounded context. In an embodiment, identifying the one or more file packages corresponding to the contextually relevant requirement cluster includes iteratively traversing the traceability knowledge graph starting from nodes corresponding to each of the epics present in the contextually relevant requirement cluster. In an example, the traceability knowledge graph may be traversed using a graph-based traversal algorithm, for example, using Dijkstra algorithm to identify the one or more file packages associated with each of the epics. In another embodiment, the traceability knowledge graph is queried using a query language, e.g., SPARQL. graph-based traversal algorithm. Further, the one or more file packages associated with each of the epics is identified based on an outcome of traversing or querying the traceability knowledge graph. For example, the outcome may include one or more attributes of the file packages stored against the corresponding nodes in the traceability knowledge graph. For example, the one or more attributes may include file identifier, file storage location etc.

Furthermore, each of the identified one or more file packages are tagged based on the bounded keyword corresponding to the bounded context. For example, metadata associated with the one or more file packages may be modified based on the bounded keywords. Such tagging helps in establishing relationships between the bounded context and the corresponding one or more file packages.

Further, the one or more file packages may be grouped or packaged based on the tagged bounded keywords. Herein, the identified at least one file package corresponds to at least one software service 342. More specifically, the at least one file package comprises codes corresponding functions and feature services associated with the at least one software service 342.

The monolith management module 306 and/or the processor 302 is further configured to provide a graphical representation indicative of the one or more file packages corresponding to the at least one software service 342 on the application management UI 316. For example, the application management UI 316 may render a notification indicating storage locations of the one or more file packages in a repository. In another embodiment, the application management UI 316 may render a notification comprising a graphical representation of the bounded context on the feature model 400, to provide the end-user with an intuitive understanding of the bounded contexts.

In a further embodiment, the monolith management module 306 and/or the processor 302 is further configured to transmit the at least one file package to the target platform 340 for deploying the at least one software service 342 on the target platform 340. In an embodiment, the target platform 340 may be specified by the user through the application management UI 316. For example, the user may provide a unique identifier, e.g., an IP address associated with the target platform 340. In case of a plurality of software services, the application management UI 316 may also be configured to provide an option to the user for selecting different target platforms for each of the software services.

In a further embodiment, monolith management module 306 and/or the processor 302 is further configured to compute a priority value for the bounded context corresponding to the at least one software service 342 based on one or more edge weights corresponding to the one or more edges in the subgraph of the feature model that forms the bounded context. The edge weights are indicated by numerical values assigned to the edges, as shown in FIG. 4B. The weights are assigned such that the sum of weights corresponding to outgoing edges of a node equals one. In an implementation, the weights may be assigned manually by the expert, for example, based on priorities of certain functions or feature services over other functions or feature services. In another implementation, the weights are assigned using a predefined logic. In the present example, a weight of 0.2 is assigned to the edge connecting the node Root 402 and the node Fun1 404, a weight of 0.4 is assigned to the edge connecting the node Root 402 and the node Fun2 406, and so on. Further, for each of the bounded contexts BC1, BC2, BC3 and BC4, priority values are computed based on edge weights present in the respective bounded contexts.

For example, the priority value of BC1 is computed as product of edge weights associated with edge connecting the node 402 and the node 404, and the edge connecting the node 404 and the node 412. Therefore, the priority value of BC1=0.2*1=0.2. Similarly, the priority value of BC2 is 0.4*0.7=0.28, the priority value of BC3 is 0.4*0.3=0.12. In case of the bounded context BC4, as there are two functions Fun3 and Fun4, the priority value of BC4 is obtained by firstly multiplying edge weights associated with each branch of the functions separately, and summing the products obtained corresponding to each of the branches. Therefore, the priority value of BC4 is 0.3*1+0.1*0.5+0.1*0.5=0.4.

The software service 342 corresponding to each of the bounded contexts is further configured for deployment on the target platform 340 based on the priority value associated with the bounded context. In particular, the priority value associated with the bounded contexts is used to determine priority in deployment of the respective software services. In the present example, BC4 has higher priority (0.4) compared to BC3 (0.12). Therefore, the software service corresponding to BC4 has to be deployed on the target platform 340 before the software services corresponding to BC3. In addition to the above, the priority value associated with the bounded contexts also enable determination of whether a bounded context is optimized or if the bounded context needs further optimization. For example, a predefined logic may initiate decomposition of a bounded context into smaller bounded contexts based on the priority value of the bounded context.

Herein, the software service 342 may be understood as deployed if the activities which are required to make the software service 342 available for use by an end-user associated with the target platform 340 are complete. The deployment process may comprise several interrelated activities with possible transitions between them. These activities may occur at the producer side (e.g., by the application developer) or at the consumer side (by the end user) or both. In some examples, the deployment process may comprise at least the release of the software service 342 and the installation and the activation of the software service 342. The release activity may follow from the completed development process and is sometimes classified as part of the development process rather than deployment process. It may comprise operations required to prepare a system (here: e.g., the application management platform 318 or an on-line app store) for assembly and transfer to the computer system (s) (here: e.g., the application management platform 318) on which it will be run in production. Therefore, it may sometimes involve determining the resources required for the system to operate with tolerable performance and planning and/or documenting subsequent activities of the deployment process.

For simple systems, the installation of the software service 342 may involve establishing some form of command, shortcut or script for executing the software (manually or automatically) of the software service 342. For complex systems, it may involve configuration of the system—possibly by asking the end user of the target platform 340, questions about the intended use of the software service 342, or directly asking them how they would like it to be configured—and/or making all the required subsystems ready to use. Activation may include starting up the executable component of software or the monolith application for the first time (which is not to be confused with the common use of the term activation concerning a software license, which is a function of Digital Rights Management systems). Once the software service 342 is deployed on the respective target platform 340, the software service 342 may be put into operation to fulfill the business needs of an end-user associated with the target platform 340. In an embodiment, the target platform 340 is a cloud platform. Other examples of target platforms may include desktop computers, tablets, laptops, server configuration systems, industrial automation devices and display devices.

Further, by way of example, the respective target platform 340 may be or comprise a manufacturing operation management (MOM) system, a manufacturing execution system (MES), and enterprise resource planning (ERP) system, a supervisory control and data acquisition (SCADA) system, or any combination thereof.

As mentioned above, the application management platform 318 may comprise the above-described functionalities of application development platforms, application lifecycle management platforms etc. The application management UI 316 may provide an interactive user interface of the application management platform 318 which supports and enables the user to decompose a monolith application to software services. For example, each of the software services may be or comprise a software program which on execution performs specific desired tasks on the respective target platform 340.

Further, a computer-readable medium 360 which may comprise a computer program product (non-transitory computer readable storage medium having instructions, which when executed by a processor, perform actions) is shown in FIG. 3, wherein the computer program product 362 may be encoded with executable instructions, that when executed, cause the computer system 300 or and/or the application management platform 318 to carry out the described method.

Figure 5:
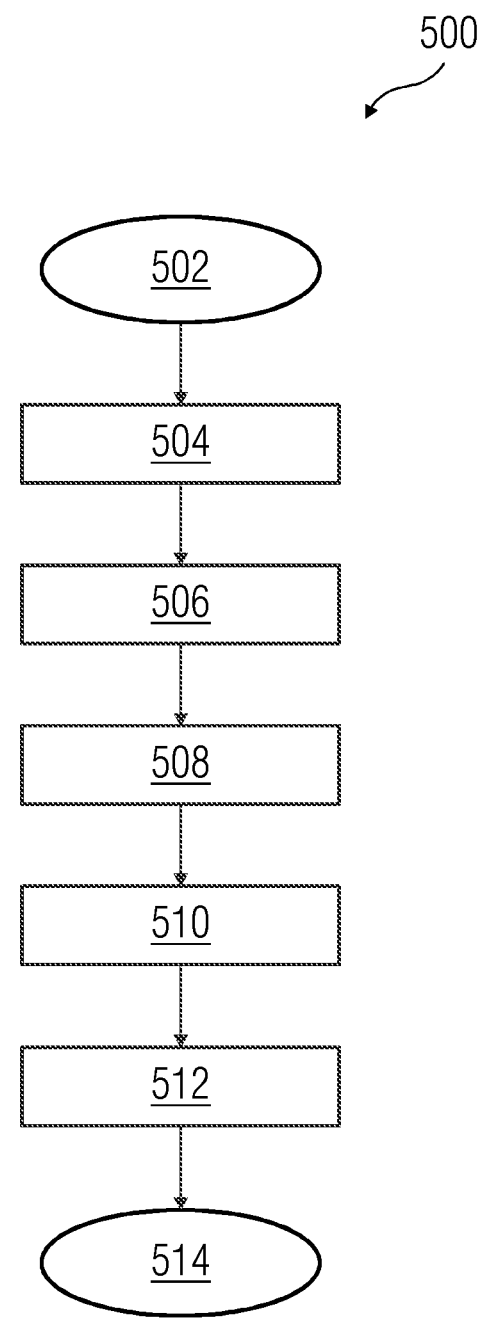
FIG. 5 shows a flowchart of a method for decomposing monolith applications into one or more software services, in accordance with an embodiment of the present invention.

FIG. 5 shows a flowchart of a method 500 for decomposing monolith applications into one or more software services, in accordance with an embodiment of the present invention. In embodiments, the method may start at 502 and the methodology may comprise several method steps carried out through operation of at least one processor, similar to the processor 302.

At step 504, a feature model associated with the monolith application is obtained from a source, by the processor, wherein the feature model is a graph data structure representative of relationships between functions and feature services in the monolith application.

At step 506, at least one bounded context present in the feature model is computed using a graph-based traversal algorithm, wherein the bounded context is a subgraph of the feature model indicative of a function and one or more feature services required for implementing the function within the monolith application, and wherein the bounded context is associated with a bounded keyword.

At step 508, a requirement cluster contextually relevant to the bounded context is selected from one or more requirement clusters, based on similarity between the bounded keyword and at least one cluster keyword corresponding to each of the requirement clusters.

At step 510, at least one file package corresponding to the contextually relevant requirement cluster is identified, for mapping to the bounded context, wherein the identified at least one file package corresponds to at least one software service.

At step 512, the at least one file package is transmitted to a target platform for deploying the at least one software service on the target platform.

At 514, the methodology may end.

It should further be appreciated that the methodology 500 may comprise other acts and features discussed previously with respect to the computer-implemented method of decomposing monolith applications to one or more software services.

In embodiments, the method may further comprise the acts of generating the one or more requirement clusters from a traceability knowledge graph associated with the monolith application, by determining similarity between epics in the traceability knowledge graph based on similarity between epic keywords associated with the epics; and grouping similar epics to generate the requirement cluster.

In embodiments, the method may further comprise the acts of transmitting the one or more file packages to a target platform for deploying the at least one software service on the target platform. In embodiments, the method may further comprise the acts of computing a priority value for the bounded context corresponding to the at least one software service based on the one or more edge weights corresponding to the one or more edges in the subgraph of the feature model that forms the bounded context; and configuring the software service for deployment on a target platform based on the priority value associated with the bounded context.

As discussed previously, acts associated with these methodologies (other than any described manual acts such as an act of manually making a selection through the input device) may be carried out by one or more processors. Such processor(s) may be included in one or more data processing systems, for example, that execute software components operative to cause these acts to be carried out by the one or more processors. In an example embodiment, such software components may comprise computer-executable instructions corresponding to a routine, a sub-routine, programs, applications, modules, libraries, a thread of execution, and/or the like. Further, it should be appreciated that software components may be written in and/or produced by software environments/languages/frameworks such as Java, JavaScript, Python, C, C #, C++ or any other software tool capable of producing components and graphical user interfaces configured to carry out the acts and features described herein.

The suggested approach offers several advantages over other approaches. E.g., the suggested approach helps with decomposition of monolith applications into software services.

Firstly, feature model-based decomposition of monolith application helps in avoiding code refactoring of monolith application, thereby saving on costs and manual efforts involved in code refactoring. Secondly, the feature model captures functions at a granular level, i.e., in terms of composition of underlying functions and feature services, thereby making identification of bounded contexts simpler.

Thirdly, employing graph data structures such as traceability knowledge graphs and feature models provide an intuitive way to store artifacts and their relationships, thereby reducing the cognitive overload on humans to understand and traverse complex information associated with a monolith application's lifecycle. The traceability knowledge graph provides an intuitive understanding of artifacts associated with the monolith application and relationships between the artifacts, thereby easing searching for artifacts and comprehension of traceability information. Further, the knowledge graph-based approach provides backward traceability along with forward traceability which is currently not present in any Application Lifecycle Management tools. Further, the traceability knowledge graph may be easily traversed in forward or reverse directions, thereby enabling execution of complex queries. For example, in forward traceability, it may be possible to view code related to a specific user-story by querying the traceability knowledge graph corresponding to the monolith application. In backward traceability, different versions of all user-stories corresponding to a specific source code may be viewed, by querying the traceability knowledge graph corresponding to the monolith application. Therefore, the suggested approach allows it to support rapid look-up and response to complex queries that may not be easily performed using existing art. Further, the impact of modifying an artifact, on other artifacts may be identified at an early stage, based on the traceability knowledge graph, thereby helping with quality improvement & mitigation of potential risks resulting from such modification.

Finally, edge weights or priority values associated with bounded contexts in the feature model help in determining relative priorities of the bounded contexts. Further, the suggested approach uses file packages corresponding to epics associated with requirement clusters. This helps in ensuring that all requirements are fulfilled when re-architecting the monolith application to software services.

Figure 6:
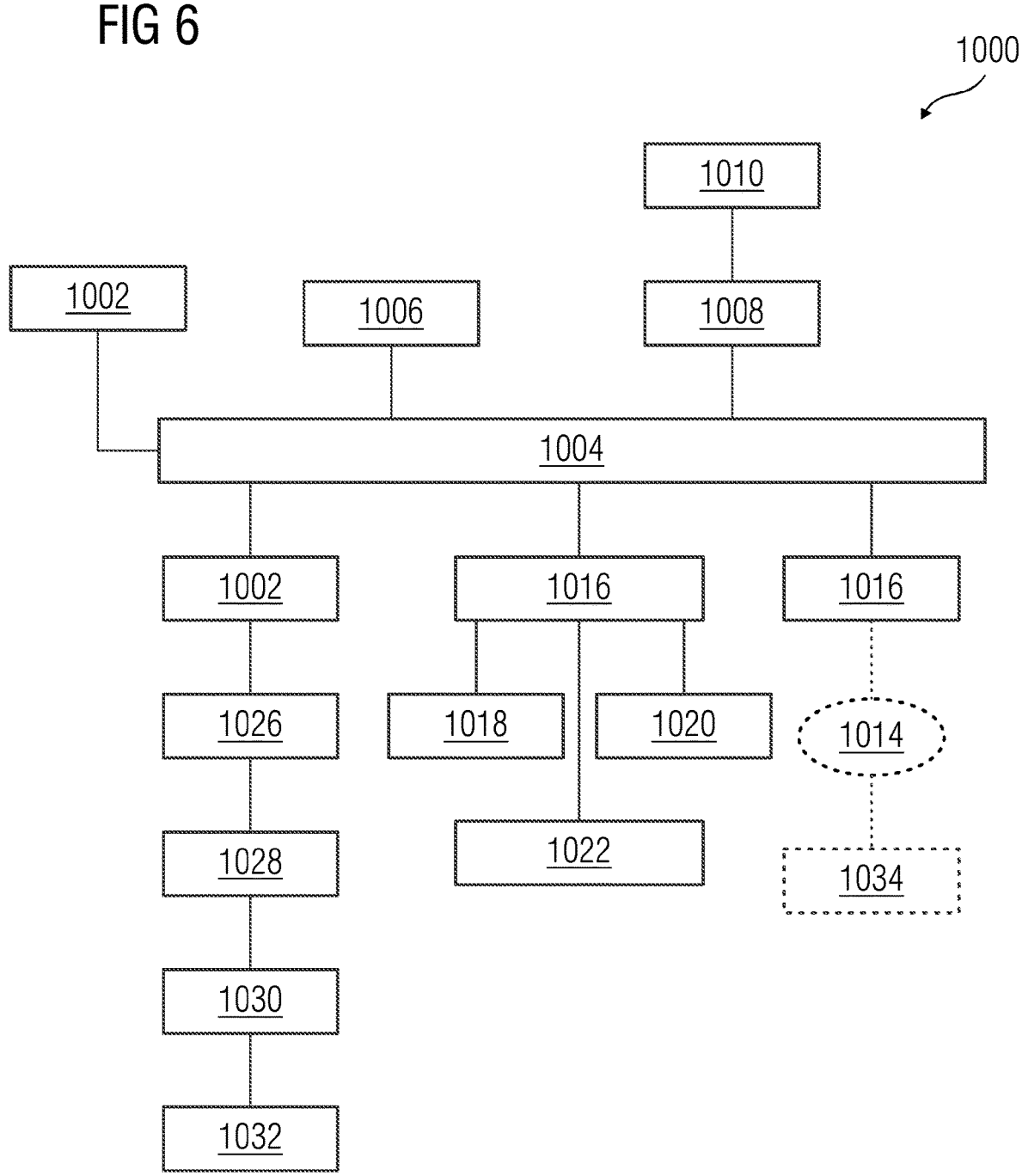
FIG. 6 illustrates a block diagram of a data processing system, in accordance with an embodiment of the present invention.

FIG. 6 illustrates a block diagram of a data processing system 1000 (also referred to as a computer system) in which an embodiment can be implemented, for example, as a portion of a product system, and/or other system operatively configured by software or otherwise to perform the processes as described herein. The data processing system 1000 may include, for example, the application management platform 318 and/or the computer system or data processing system 300 mentioned above. The data processing system depicted includes at least one processor 1002 (e.g., a CPU) that may be connected to one or more bridges/controllers/buses 1004 (e.g., a north bridge, a south bridge). One of the buses 1004, for example, may include one or more I/O buses such as a PCI Express bus. Also connected to various buses in the depicted example may include a main memory 1006 (RAM) and a graphics controller 1008. The graphics controller 1008 may be connected to one or more display devices 1010. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 1012 (Ethernet controllers, Wi-Fi controllers, cellular controllers) operative to connect to a local area network (LAN), Wide Area Network (WAN), a cellular network, and/or other wired or wireless networks 1014 or communication equipment.

Further components connected to various buses may include one or more I/O controllers 1016 such as USB controllers, Bluetooth controllers, and/or dedicated audio controllers (connected to speakers and/or microphones). It should also be appreciated that various peripherals may be connected to the I/O controller(s) (via various ports and connections) including input devices 1018 (e.g., keyboard, mouse, pointer, touch screen, touch pad, drawing tablet, trackball, buttons, keypad, game controller, gamepad, camera, microphone, scanners, motion sensing devices that capture motion gestures), output devices 1020 (e.g., printers, speakers) or any other type of device that is operative to provide inputs to or receive outputs from the data processing system. Also, it should be appreciated that many devices referred to as input devices or output devices may both provide inputs and receive outputs of communications with the data processing system. For example, the processor 1002 may be integrated into a housing (such as a tablet) that includes a touch screen that serves as both an input and display device. Further, it should be appreciated that some input devices (such as a laptop) may include a plurality of different types of input devices (e.g., touch screen, touch pad, keyboard). Also, it should be appreciated that other peripheral hardware 1022 connected to the I/O controllers 1016 may include any type of device, machine, or component that is configured to communicate with a data processing system.

Additional components connected to various buses may include one or more storage controllers 1024 (e.g., SATA). A storage controller may be connected to a storage device 1026 such as one or more storage drives and/or any associated removable media, which can be any suitable non-transitory machine usable or machine-readable storage medium. Examples include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also, in some examples, a storage device such as an SSD may be connected directly to an I/O bus 1004 such as a PCI Express bus.

A data processing system in accordance with an embodiment of the present disclosure may include an operating system 1028, software/firmware 1030, and data stores 1032 (that may be stored on a storage device 1026 and/or the memory 1006). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 1012 may be connected to the network 1014 (not a part of data processing system 1000), which can be any public or private data processing system network or combination of networks, as known to those of skill in the conventional art, including the Internet. Data processing system 1000 can communicate over the network 1014 with one or more other data processing systems such as a server 1034 (also not part of the data processing system 1000). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 1002 and associated components may correspond to a virtual machine executing in a virtual machine environment of one or more servers. Examples of virtual machine architectures include VMware ESCi, Microsoft Hyper-V, Xen, and KVM.

Those of ordinary skill in the conventional art will appreciate that the hardware depicted for the data processing system may vary for particular implementations. For example, the data processing system 1000 in this example may correspond to a computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, it should be noted that the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) microprocessors, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the conventional art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1000 may conform to any of the various current implementations and practices known in the conventional art.

Also, it should be understood that the words or phrases used herein should be construed broadly, unless expressly limited in some examples. For example, the terms "include"

and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is executing the software/firmware, which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may also correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may mean that an element is relatively near to but not in contact with a further element; or that the element is in contact with the further portion, unless the context clearly indicates otherwise.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for decomposing a monolith application into at least one software service, the method comprising:
obtaining, by a processor, a feature model associated with the monolith application from a source, wherein the feature model is a graph data structure representative of relationships between functions and feature services in the monolith application;
computing at least one bounded context present in the feature model using a graph-based traversal algorithm, wherein the at least one bounded context is a subgraph of the feature model indicative of a function and one or more feature services required for implementing the function within the monolith application, and wherein the at least one bounded context is associated with a bounded keyword;
selecting a requirement cluster contextually relevant to the at least one bounded context from one or more requirement clusters, based on similarity between the bounded keyword and at least one cluster keyword corresponding to each of the requirement clusters;
identifying one or more file packages corresponding to the contextually relevant requirement cluster, for mapping to the bounded context, wherein the identified at least one file package corresponds to the at least one software service; and
providing a graphical representation indicative of the one or more file packages corresponding to the at least one software service on an application management user interface.

2. The method according to claim 1, further comprising generating the one or more requirement clusters from a traceability knowledge graph associated with the monolith application.

3. The method according to claim 2, wherein the traceability knowledge graph is a graph data structure indicative of relationships between a plurality of artifacts generated during a development phase of the monolith application, wherein the plurality of artifacts comprises at least epics and file packages associated with the monolith application.

4. The method according to claim 3, wherein each of the requirement clusters comprises one or more epics, and wherein each of the one or more epics is associated with at least one file package.

5. The method according to claim 3, wherein generating the one or more requirement clusters from a traceability knowledge graph associated with the monolith application comprises:
determining similarity between two or more epics in the traceability knowledge graph based on similarity between epic keywords associated with the two or more epics; and
grouping similar epics to generate each of the one or more requirement clusters.

6. The method according to claim 5, wherein similarity between the epic keywords is determined by:
determining vector embedding corresponding to each epic keyword among a plurality of epic keywords; and
comparing the vector embedding of the epic keyword to the vector embedding of each of the other epic keywords among the plurality of epic keywords, using soft cosine similarity algorithm, wherein a first similarity value generated by the soft cosine similarity algorithm for the two or more epic keywords is indicative of an extent of similarity in the respective epics corresponding to the two or more epic keywords.

7. The method according to claim 1, wherein selecting a requirement cluster contextually relevant to the at least one bounded context from the one or more requirement clusters, based on the similarity between the bounded keyword and the at least one cluster keyword corresponding to each of the requirement clusters, comprises:

determining vector embeddings corresponding to each of the bounded keyword and the at least one cluster keyword; and comparing the vector embedding of the bounded keyword to the vector embedding of the at least one cluster keyword using soft cosine similarity algorithm, wherein the contextually relevant requirement cluster is identified based on a second similarity value generated by the soft cosine similarity algorithm.

8. The method according to claim 3, wherein identifying the one or more file packages corresponding to the contextually relevant requirement cluster, for mapping to the bounded context, comprises:

iteratively traversing the traceability knowledge graph starting from nodes corresponding to each of the epics present in the contextually relevant requirement cluster;

identifying the one or more file packages associated with each of the epics based on an outcome of querying the traceability knowledge graph; and tagging each of the identified one or more file packages based on the bounded keyword corresponding to the bounded context.

9. The method according to claim 1, further comprising: transmitting the one or more file packages to a target platform for deploying the at least one software service on the target platform.

10. The method according to claim 9, further comprising:

computing a priority value for the bounded context corresponding to the at least one software service based on the one or more edge weights corresponding to the one or more edges in the subgraph of the feature model that forms the bounded context; and configuring the software service for deployment on the target platform based on the priority value associated with the bounded context.

11. The method according to claim 10, wherein the priority value for the bounded context is computed based on edge weights associated with edges present in the bounded context, using a predefined logic.

12. The method according to claim 9, wherein the target platform is a cloud platform.

13. A hardware computer system arranged and configured to execute the steps of the computer-implemented method according to claim 1.

14. A computer program product, comprising a computer readable hardware storage device having computer readable program code stored therein, said program code executable by a processor of a computer system to implement a method of claim 1.

15. A non-transitory computer-readable medium comprising a computer program product comprising computer program code which, when executed by a computer system, cause the computer system to carry out the method of claim 1.

* * * * *